United States Patent
Cummins

(10) Patent No.: US 6,321,030 B1
(45) Date of Patent: Nov. 20, 2001

(54) DC MOTOR CONTROLLER WITH FULL-WAVE RECTIFIED AC FOR MOTOR DRIVE POWER

(76) Inventor: Michael D. Cummins, 2869 Long Lake Dr., Titusville, FL (US) 32780-7544

( * ) Notice: Subject to any disclaimer, the term of this patent is extended or adjusted under 35 U.S.C. 154(b) by 0 days.

(21) Appl. No.: 09/641,628

(22) Filed: Aug. 18, 2000

(51) Int. Cl.$^7$ ........................................................ H02P 5/16
(52) U.S. Cl. .................. 388/800; 388/804; 318/600; 318/603; 318/280; 318/268
(58) Field of Search ..................... 318/138, 254, 318/245, 268, 280–293, 599, 600–618; 388/800–823

(56) References Cited

U.S. PATENT DOCUMENTS

| | | | |
|---|---|---|---|
| 4,114,075 | * | 9/1978 | Minakuchi . |
| 4,870,340 | * | 9/1989 | Kral . |
| 5,003,455 | * | 3/1991 | Miller . |
| 5,723,915 | * | 3/1998 | Maher et al. . |
| 6,118,239 | * | 9/2000 | Kadah . |

* cited by examiner

Primary Examiner—Paul Ip
(74) Attorney, Agent, or Firm—J. Sanchelima

(57) ABSTRACT

A controller using rectified AC voltage to drive a DC motor. A first rectified produces a waveform that passes through zero voltage in synchronization with the A.C. supply voltage. The first rectified voltage is applied to the D.C. motor. A second rectified voltage produces a waveform that passes through zero voltage in synchronization with the A.C. supply voltage. A circuit generating a unipolar waveform output voltage drives a switch that turns on and off the connection of the first rectified voltage to the D.C. motor. The on time can vary from zero to one half of the period of the AC voltage for maximum speed. The switching is synchronized with the unipolar waveform. The time on is varied by varying the pulse width driving the switching device.

4 Claims, 2 Drawing Sheets

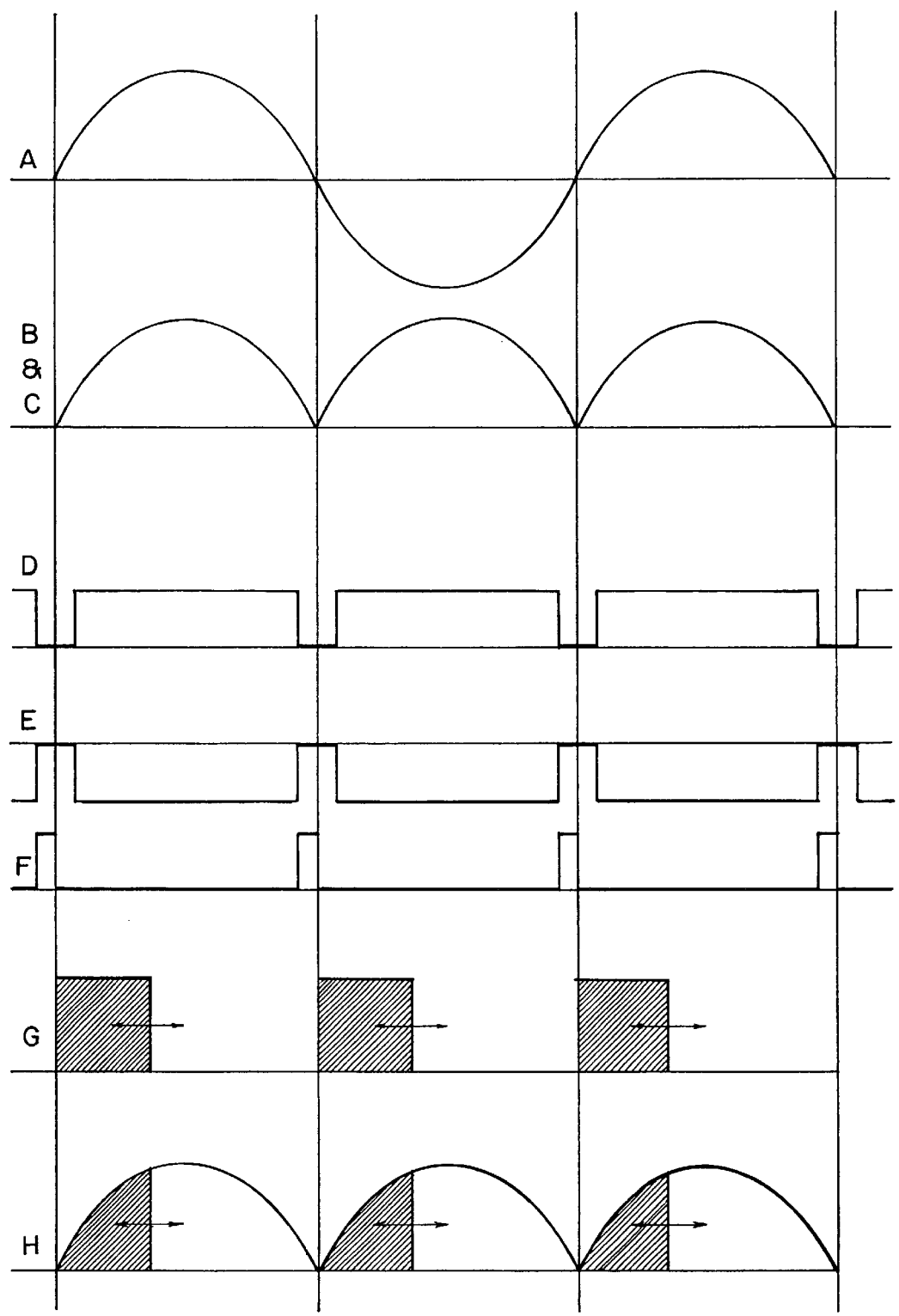
_Fig. 2_

DC MOTOR CONTROLLER WITH FULL-WAVE RECTIFIED AC FOR MOTOR DRIVE POWER

BACKGROUND OF THE INVENTION

1. Field of the Invention.

The present invention relates to a DC motor controller utilizing full-wave rectified alternating current (AC) for the motor drive power, and more particularly, to DC motor controller that will control the speed and other related parameters such as torque of a direct current (DC) motor.

2. Description of the Related Art.

Many devices and methods to control speed of a DC motor have been designed in the past. None of them, however, include a circuit design that starts the conduction at AC zero (or near zero) and stops conduction at some higher AC voltage to allow speed control from zero (rotor stop) to some maximum rotor speed rotation.

One commonly accepted method to control speed of a DC motor is to vary the direct current input voltage to the motor. This requires a relatively expensive and complicated DC power supply, since some form of DC voltage/current regulation is commonly expected.

Speed can also be controlled from the AC line using thyristors to turn the AC signal on and off. This method is well known but has some problems with smooth start torque (from zero, or rotor stop) due to the thyristor requirements of turning on (conduction start) at some relative high voltage in the AC cycle and turning off (conduction stop) at AC zero voltage. Turn on time is typically 5 microseconds and turn off time is about 25 microseconds. To avoid detecting false turn on/turn off times, a rather complicated snubber circuit is required. This is variously referred to as time interval modulation, phase control, pulse width control, etc., depending on the scheme of controlling conduction time and/or applied voltage. Speed control is typically in the 50:1 range.

With the present invention, the DC motor accepts a unipolar current/voltage of constant DC voltage or a rectified AC signal. i.e. as long as the signal is unipolar and the current into the motor only conducts in one direction, the motor operates effectively. When the voltage is increased, the speed increases (the motor rotates faster). If the voltage reverses, both the current and the direction of rotation reverses. A DC motor is near a "constant current" device. As voltage (or ON time) is increased, rotational speed increases directly as the voltage (or ON time) but the motor current remains nearly constant (if load is constant, which is the typical motor application) over the voltage (or ON time) control range. This is due to the reverse EMF of the rotor coil and inertia of the rotor/load characteristics.

SUMMARY OF THE INVENTION

It is one of the main objects of the present invention to provide a simple DC motor controller that will smoothly control the speed (and other related parameters such as torque) of a direct current DC motor.

It is another object of this invention to provide a speed and torque controller by the application of (unipolar) voltage and current from a rectified AC source.

It is still another object of the present invention to provide a DC motor controller that controls the speed or reverse its rotational direction by simply reversing voltage polarity.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2 includes the following wave form representations:

Figure 1:
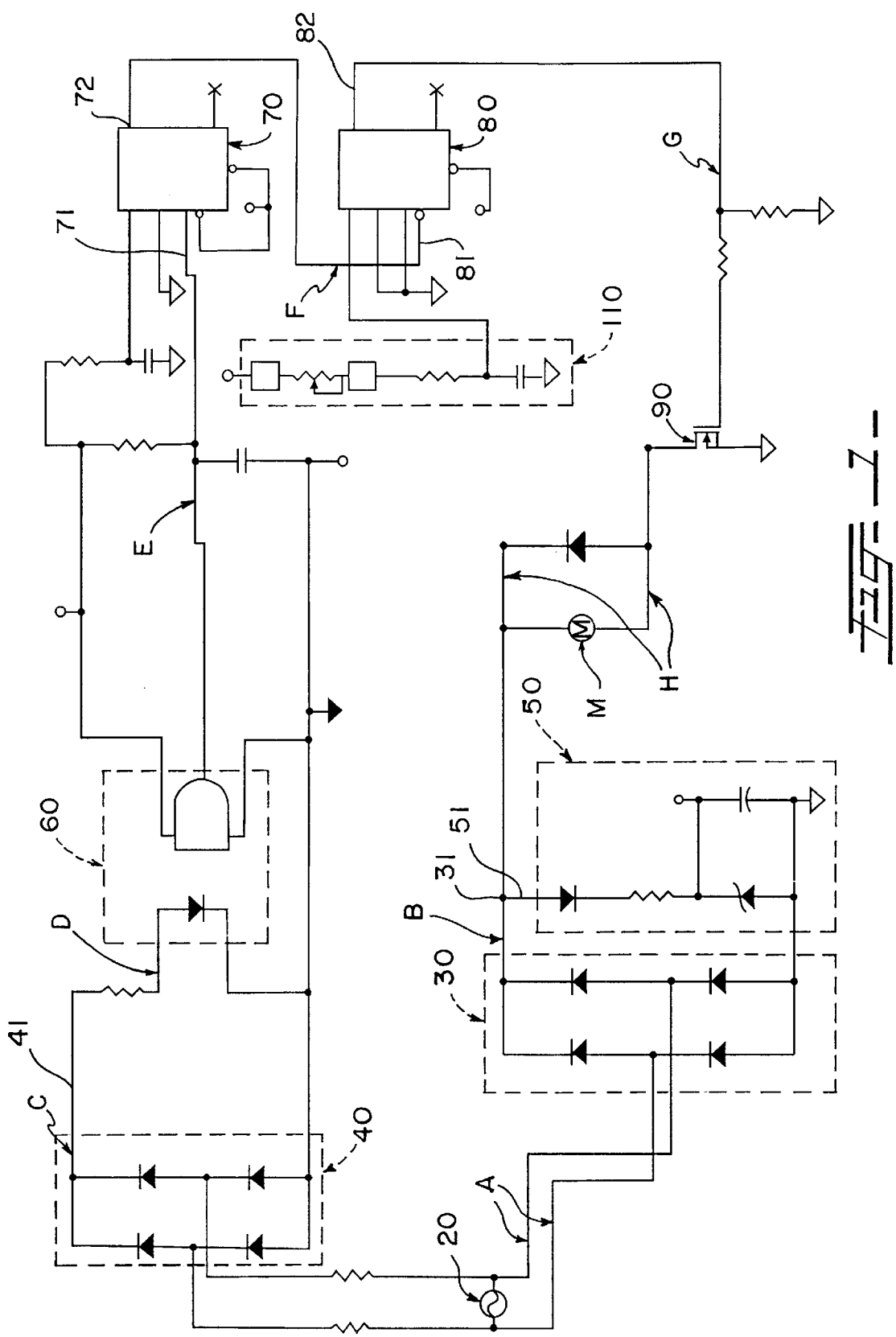
FIG. 1 represents an electronic diagram of the motor controller object of the present invention.

A shows a representation of the AC voltage input.

B and C illustrates a representation of the full wave rectified AC input.

D is a representation of the ON/OFF current conduction of the opto-coupled device.

E is a schematic representation of the output pulse from the opto-coupled device and referenced with letter E in FIG. 1.

F represents a timing chart of the fixed time, positive going output pulse from the first monostable multivibrator to set the zero reference time, and referenced with letter F in FIG. 1.

G illustrates the timing chart for the adjustable time, positive going output pulse from the second monostable multivibrator to control switching FET on time and current to the motor M, and referenced with letter G in FIG. 1.

H illustrates the timing chart for current time to motor.

DETAILED DESCRIPTION OF THE PREFERRED EMBODIMENT

Referring now to the drawings, where the present invention is generally referred to with numeral 10, it can be observed that it basically includes a source of AC voltage 20, as shown in waveform A, two full wave rectifier assemblies 30 and 40 to provide two separate sources of rectified direct voltage. The output 31 of assembly 30 provides a full wave rectified output to motor M and to input 51 of a stable D.C. source 50 providing a voltage Vdd. Output 41 of assembly 40 provides a full wave rectified voltage which is presented to the input of opto-coupler device 60, as represented by waveform B, C, and D in FIG. 2.

Opto-coupler device 60 can be implemented with a H11L1 manufactured by Motorola, Inc., or equivalent device. The resulting output to the first monostable has the characteristics of waveform E, as shown in FIG. 2.

Waveform E is connected to input 71 of monostable multivibrator IC 70 and its output 72 is shown as waveform F in FIG. 2, which is in turn connected to monostable multivibrator IC 80's input 81. IC's 70 and 80 are implemented, in the preferred embodiment, with Motorola's MCI4538B. Output 82 provides a sign as represented in waveform G in FIG. 2 and is connected to the gate of switching device 90.

Switching device 90 is implemented with a field effect transistor (FET) to switch on and off the modulated power applied to motor M.

The result being that D.C. motor M is driven by a modulated rectified AC voltage as shown in waveform H in FIG. 2. The speed of motor M is determined by the on-time of one half of a full wave rectified AC voltage. Thus, a smooth start torque can be accomplished from zero (rotor stop) and continue to the maximum rotor speed when the sloped voltage G, shown as G in FIG. 2, reaches one half of the period of the AC. By varying the RC constant of RC circuit 110, the width of waveform G in FIG. 2, is varied and thus the time ON-OFF of switching device 90.

Reversal of rotation can be readily achieved by simply reversing the voltage polarity of the motor leads. This contrasts with the difficulties typically experienced with A.C. motors.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A controller for DC motors, comprising:

A) a source of A.C. voltage passing through A.C. zero voltage two times per cycle;

B) first full wave rectifying means having a first input connected to said AC voltage and two first outputs producing a first wave rectified voltage going to zero voltage in synchronization with said A.C. zero voltages;

C) D.C. motor means having first and second inputs, said first input being connected to one of said two first outputs;

D) second full wave rectifying means having a second input connected to said AC voltage and a second output providing a full wave rectified voltage going to zero voltage in synchronization with said A.C. zero voltages;

E) means for generating an output signal synchronized to said A.C. zero voltages;

F) means for generating a unipolar waveform output voltage with a zero start voltage that coincides with said output signal;

G) switching means for turning on and off the connection of the second input of said D.C. motor means to the other output in response to said unipolar waveform output driving said switching means, said switching means being synchronized with said A.C. zero voltages; and H) means for varying times for turning on and off said switching means by changing the pulse width of said unipolar waveform output voltage driving said switch means.

2. The controller set forth in claim 1 wherein said means for generating a synchronized output signal is implemented with an opto-coupler device connected to said second full wave rectifying means.

3. The controller set forth in claim 2 wherein said means for generating a unipolar waveform output is implemented with two monostable multivibrators.

4. The controller set forth in claim 3 wherein said means for varying times for turning on and off said switching means is implemented with RC time constant circuits connected to said monostable multivibrators.

* * * * *